(12) United States Patent
Wallaert

(10) Patent No.: US 9,377,212 B2
(45) Date of Patent: Jun. 28, 2016

(54) TIME-BASED SETBACK RECOVERY

(75) Inventor: Timothy E. Wallaert, Wylie, TX (US)

(73) Assignee: Lennox Industries Inc., Richardson, TX (US)

( * ) Notice: Subject to any disclaimer, the term of this patent is extended or adjusted under 35 U.S.C. 154(b) by 687 days.

(21) Appl. No.: 13/328,017

(22) Filed: Dec. 16, 2011

(65) Prior Publication Data

US 2013/0153195 A1 Jun. 20, 2013

(51) Int. Cl.
*G05D 23/19* (2006.01)
*F24F 11/00* (2006.01)

(52) U.S. Cl.
CPC ........... *F24F 11/0012* (2013.01); *F24F 11/006* (2013.01); *G05D 23/1904* (2013.01); *F24F 2011/0061* (2013.01); *F24F 2011/0064* (2013.01)

(58) Field of Classification Search
USPC .......................................... 700/276, 290, 291
See application file for complete search history.

(56) References Cited

U.S. PATENT DOCUMENTS

| | | | |
|---|---|---|---|
| 4,347,974 A | | 9/1982 | Pinckaers et al. |
| 4,911,358 A | * | 3/1990 | Mehta .......................... 236/46 R |
| 5,822,997 A | * | 10/1998 | Atterbury ......................... 62/180 |
| 8,204,628 B2 | * | 6/2012 | Schnell et al. ................. 700/278 |
| 2007/0005190 A1 | * | 1/2007 | Feinleib ................ F24H 9/2021 700/275 |
| 2007/0043477 A1 | * | 2/2007 | Ehlers et al. ................... 700/276 |
| 2010/0243231 A1 | * | 9/2010 | Rosen ........................... 165/237 |
| 2012/0016524 A1 | * | 1/2012 | Spicer .................... G05B 15/02 700/276 |
| 2012/0065783 A1 | * | 3/2012 | Fadell et al. ................... 700/276 |
| 2012/0085831 A1 | * | 4/2012 | Kopp .................. F24F 11/0009 236/46 A |
| 2013/0013122 A1 | * | 1/2013 | Dyess et al. ................... 700/295 |

OTHER PUBLICATIONS

European Search Report dated Sep. 5, 2013, Application No. 12197004.0-1602, Applicant: Lennox Industries, Inc., 5 pages.

* cited by examiner

*Primary Examiner* — Robert Fennema
*Assistant Examiner* — Md N Mia
(74) *Attorney, Agent, or Firm* — Baker Botts L.L.P.

(57) ABSTRACT

A system controller of a heating, ventilation and air-conditioning system is configured to control the operation of a demand unit to maintain a comfort characteristic setpoint of a conditioned space. The controller includes a setback calculation module that is configured to calculate a setback value of the setpoint as a function of a recovery time from the setback value to the setpoint.

28 Claims, 5 Drawing Sheets

TIME-BASED SETBACK RECOVERY

TECHNICAL FIELD

This application is directed, in general, to a heating, ventilating and air conditioning systems and, more specifically, to a methods and systems for controlling such systems.

BACKGROUND

Modern heating, ventilating and air conditioning (HVAC) system controllers typically include a setback function. The setback function allows the system operator, e.g. a homeowner, to set a different control temperature for each of several time ranges of the day. Thus, the operator may have a different control temperature upon waking, while leaving the home unoccupied, and for sleeping. Typically during the cooling season the setpoint temperature is higher when the home is unoccupied and lower when the home is occupied. Conversely, during the heating season setpoint temperature is typically lower when the home is unoccupied and higher when the home is occupied. Thus, the setback function is an important aspect of reducing the energy required to cool and heat the home.

SUMMARY

One aspect provides a system controller of an HVAC system. The controller is configured to control the operation of a demand unit to maintain a comfort characteristic setpoint of a conditioned space. The controller includes a setback calculation module that is configured to calculate a setback value of the setpoint as a function of a recovery time from the setback value to the setpoint.

Another aspect provides a method of manufacturing an HVAC system. The method includes configuring a system controller to control the operation of a demand unit to maintain a comfort characteristic setpoint of a conditioned space. A setback calculation module of the system controller is configured to calculate a setback value of the setpoint as a function of a recovery time from the setback value to the setpoint.

Another aspect provides an HVAC system controller. The controller includes a processor and a memory. The memory contains instructions that are configured to control the operation of a demand unit to maintain a comfort characteristic setpoint of a conditioned space. The instructions also calculate a setback value of the setpoint as a function of a recovery time from the setback value to the setpoint.

Another aspect provides an HVAC system controller. The controller includes a processor and a memory. The memory contains a data structure that correlates a recovery time of a comfort characteristic setpoint maintained by the processor with at least one measured local environmental condition. The processor is configured to update the data structure to maintain a comfort characteristic setpoint of a conditioned space. The processor is further configured to calculate a setback value of the setpoint as a function of the recovery time.

BRIEF DESCRIPTION

Figure 1:
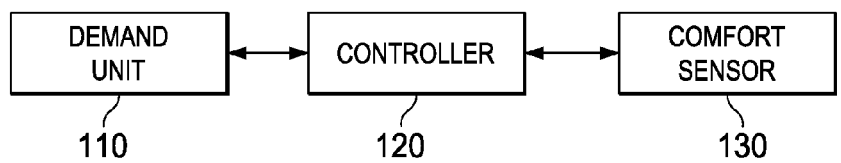
Figure 2A:
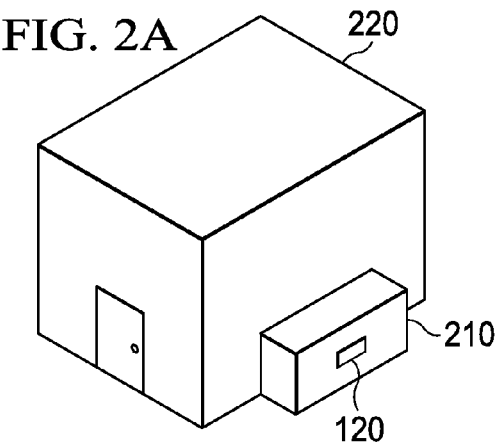
Figure 2B:
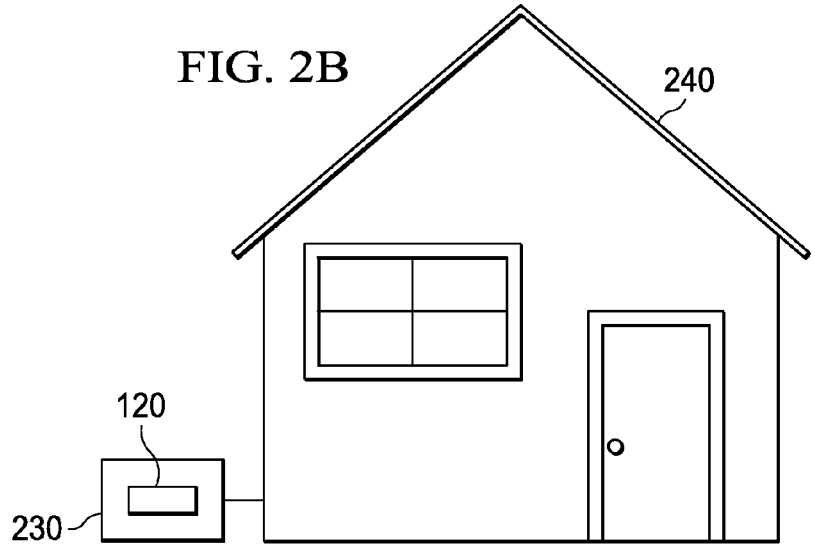
Figure 2C:
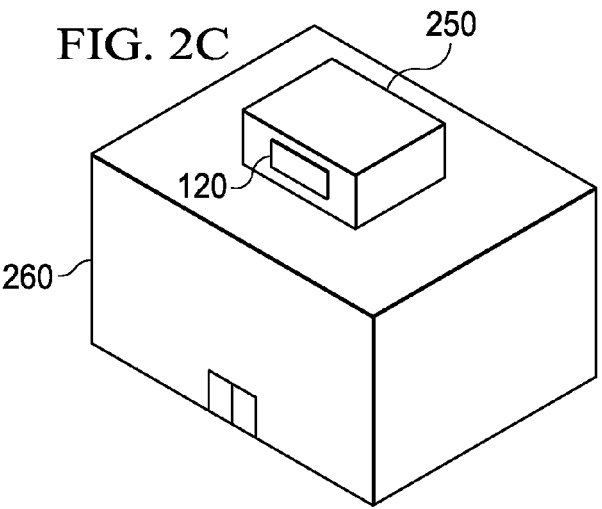
Figure 3:
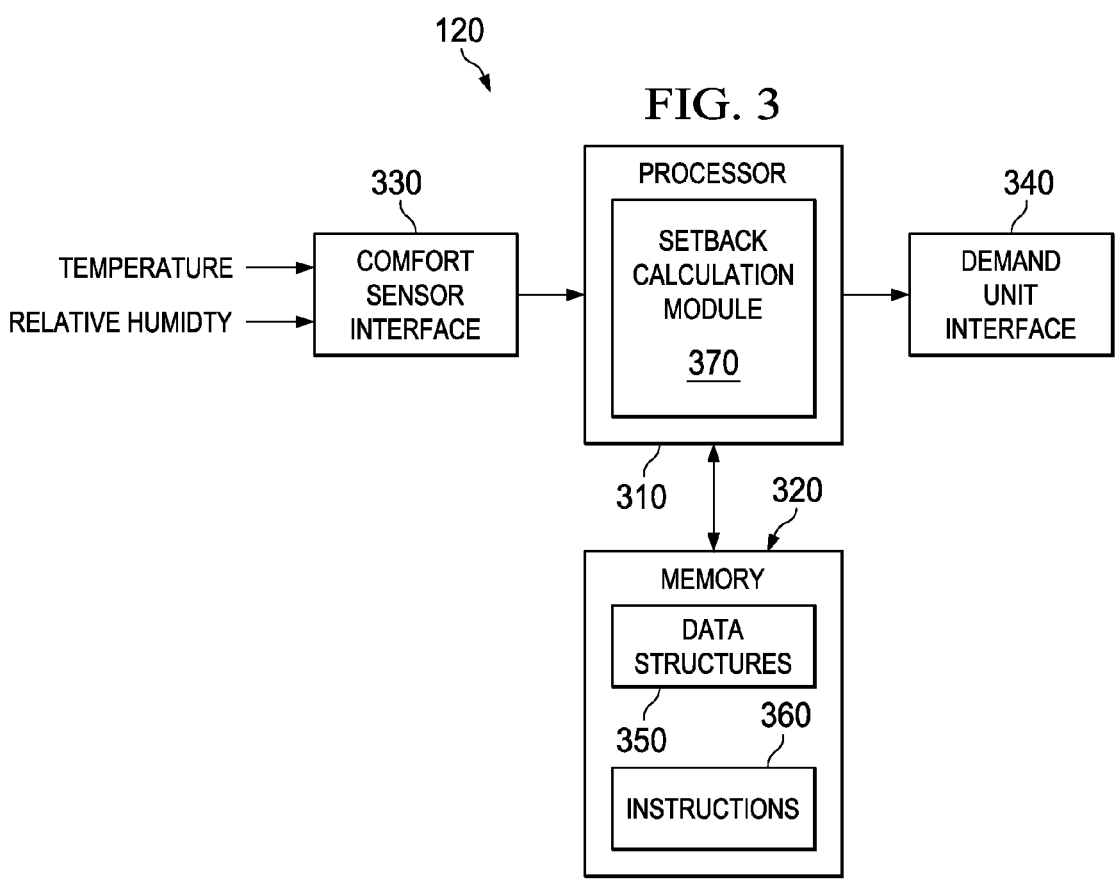
Figure 4:
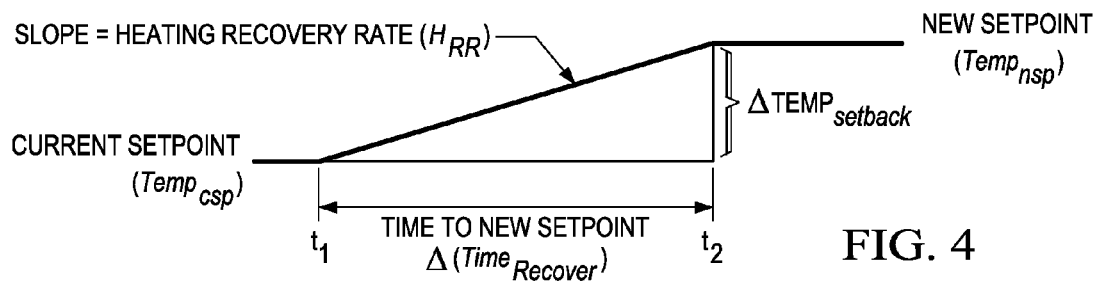
Figure 6:
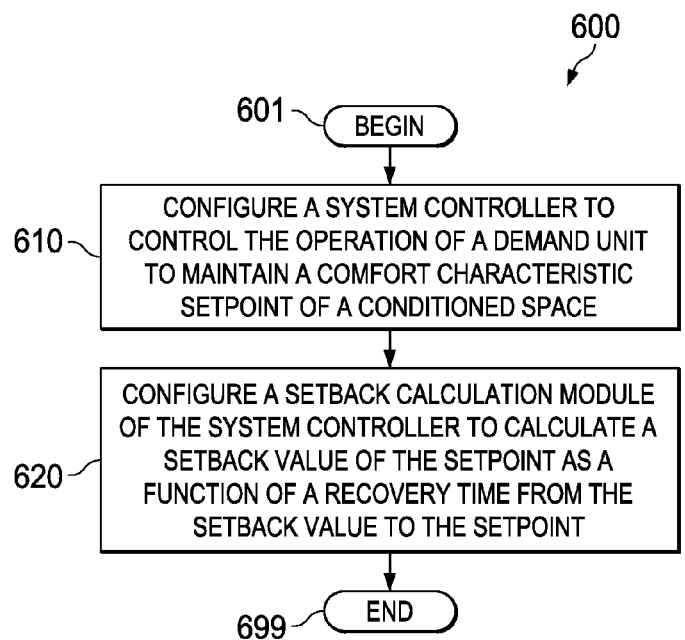
Figure 5A:
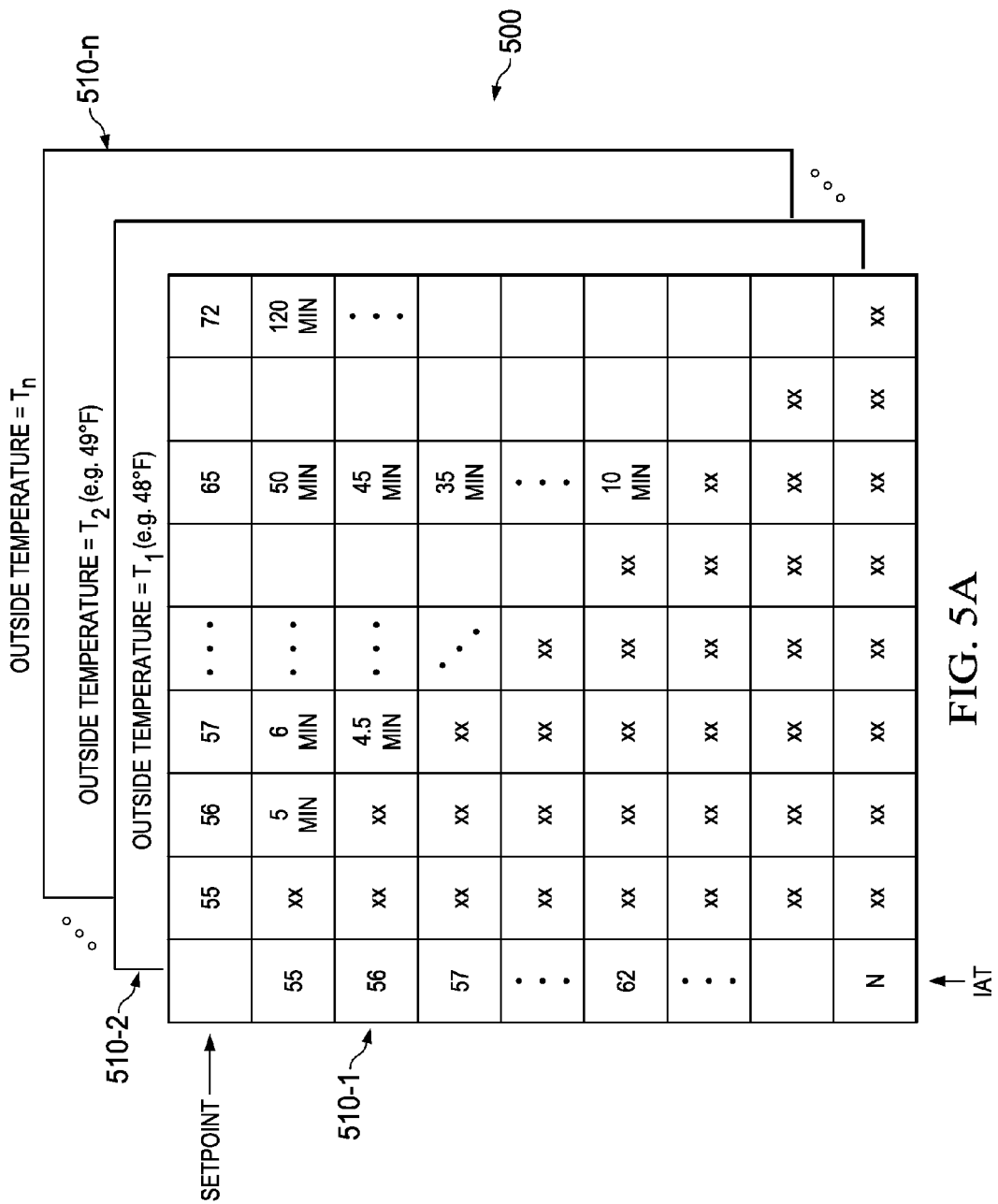
Figure 5B:
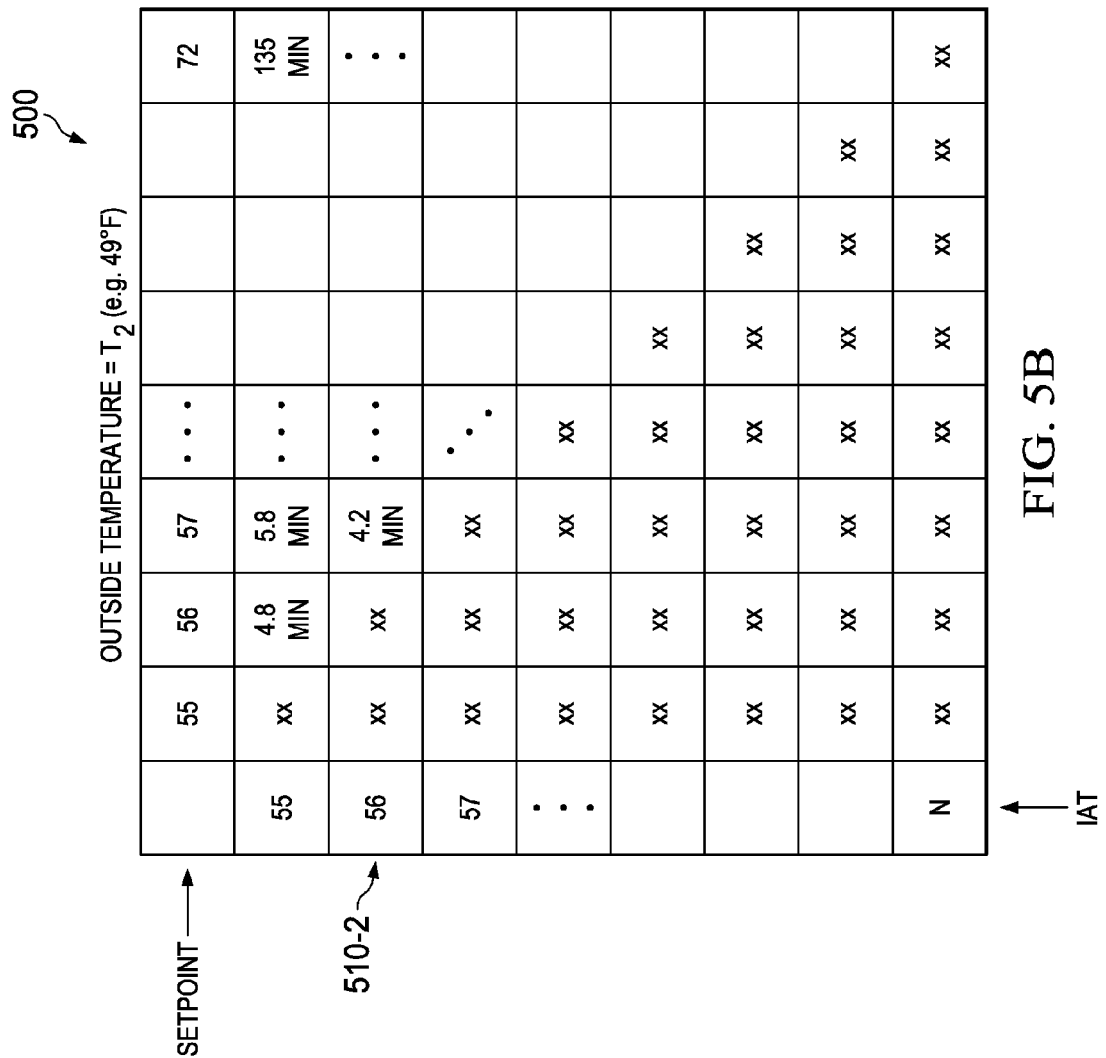

Reference is now made to the following descriptions taken in conjunction with the accompanying drawings, in which:

FIG. 1 illustrates an HVAC system configured according to various embodiments of the disclosure;

FIGS. 2A-2C respectively illustrate a refrigeration system, a residential system and a commercial system that each include an HVAC controller configured as described by one or more embodiments of the disclosure;

FIG. 3 presents an illustrative embodiment of an HVAC controller, e.g. the controller shown in FIG. 1;

FIG. 4 illustrated a temperature recovery characteristic that relates the recovery time of an HVAC system to the temperature difference of the recovery;

FIGS. 5A and 5B show an illustrative and nonlimiting embodiment of a three-dimensional table relating recovery time of an HVAC system, e.g. the system of FIG. 1, to an inside air temperature and a setpoint temperature for a particular outside air temperature; and FIG. 6 presents a method 600, e.g. of forming an HVAC system according to various embodiments of the disclosure.

DETAILED DESCRIPTION

Smooth, or smart setback, recovery (SSR) schemes typically use a straight line, linear interpolation to estimate when to activate heating or cooling of an HVAC system to achieve at a desired time a desired setpoint temperature of a space conditioned by the system. Such schemes typically calculate a recovery time as a function of a setback temperature and a setpoint temperature. Such a calculation typically follows the form $$\text{Recovery Time} = f(\text{Temp}_{setpoint}, \text{Temp}_{setback}) \qquad (1)$$

where $\text{Temp}_{Setpoint}$ is a desired operating setpoint of the system, such as when the conditioned space is occupied, and $\text{Temp}_{Setback}$ is a setback temperature, e.g. a temperature maintained by the system when the conditioned space is unoccupied. For example, in some cases the recovery time is computed as a function of the difference between $\text{Temp}_{Setpoint}$ and $\text{Temp}_{Setback}$. In the case represented by Eq. 1, an operator of the system has no direct control over the duration of the recovery time, which is instead dependent on the difference between the selected setback and setpoint temperatures. Thus the setback and setpoint temperatures are independent variables, and the recovery time is a dependent variable.

In contrast with conventional setback recovery schemes, embodiments of the disclosed invention use a method in which an HVAC controller operates to reach a comfort setpoint, e.g. a setpoint temperature, within a predetermined time period. Thus, in contrast to conventional HVAC control, embodiments of the disclosure may determine the setback temperature such that the HVAC system may reach the setpoint temperature from the setback temperature within the predetermined time period. The controller may implement a function of the form $$\Delta \text{Temp}_{Setback} = f(\text{Time}_{Recover}). \qquad (2)$$

where a setback value $\Delta \text{Temp}_{setback} = \text{Temp}_{Setpoint} - \text{Temp}_{Setback}$ and $\text{Time}_{Recover}$ is the selected recovery time. Thus in contrast to conventional operation the recovery time is an independent variable, and the setback temperature is a dependent variable.

The ability to set a predetermined recovery time, and to constrain the setback temperature thereby, advantageously provides a new control method for HVAC operation that may, e.g. provide a system operator, such as a homeowner, desirable control options for balancing comfort and energy savings of an HVAC system.

FIG. 1 illustrates without limitation a system 100 configured in accordance with embodiments of the invention. The system 100 includes a demand unit 110 and a controller 120. The demand unit 110 may be any type of HVAC component configured to provide or contribute to maintaining a comfort characteristic setpoint in a conditioned space in response to control signals from the controller 120. In an illustrative and nonlimiting example a comfort characteristic may be air temperature, humidity or particle (e.g. dust) concentration. Various embodiments are described herein using heating as an example, for which the demand unit 110 may include a furnace. Those skilled in the pertinent art will understand that the principles of the described embodiments may be extended to use in, e.g. cooling, refrigeration, humidification, dehumidification and particle filtration applications. Such alternate embodiments are explicitly included in the scope of the description and the claims.

The controller 120 may include any type of controller that is configured or is configurable to implement the methods disclosed herein. For example, the controller 120 may be an otherwise conventional 24 VAC controller that presents basic setback functionality to the operator, or may be a "smart" controller that provides augmented functionality and options to the operator, such as via a touch screen interface. In a nonlimiting embodiment, the controller 120 may be configured as described in U.S. patent application Ser. No. 12/603, 382 to Grohman, Ser. No. 12/603,526 to Grohman, et al., and Ser. No. 12/884,921 to Wallaert, et al., each of which is incorporated herein by reference.

The controller 120 receives from a comfort sensor 130 comfort data that describes the comfort characteristic. In the embodiment currently under consideration, in which the demand unit 110 includes a furnace, the comfort data includes an inside air temperature (IAT) of the conditioned space. In other embodiments, comfort data may include relative humidity and/or particulate level.

FIGS. 2A-2C illustrate various example embodiments in which the controller 120 may be applied. In FIG. 2A, the controller 120 is associated with a refrigeration demand unit 210 of a refrigerator 220, e.g. a commercial walk-in refrigerator. The demand unit 210 may include a compressor and a fan to provide cooling to the refrigerator 220 under control by the controller 120. In FIG. 2B, the controller 120 is associated with a residential demand unit 230 of a residential structure 240, e.g. a home. The demand unit 230 may include a fan and a compressor or a furnace to cool or warm air within the structure 240 under control by the controller 120. In FIG. 2C, the controller 120 is associated with a commercial demand unit 250 of a commercial structure 260, e.g. a retail store. The demand unit 250 may be a rooftop unit of the structure, and may include a fan and a compressor or a furnace to cool or warm air within the structure 260 under control by the controller 120. In each of these embodiments the controller 120 may be located anywhere within the associated structure or demand unit, and configured to communicate control signals to the associated demand unit in any manner whatsoever.

FIG. 3 presents the controller 120 according to various embodiments of the invention. The controller 120 includes a processor 310, a memory 320, a comfort sensor 330 and a demand unit interface 340. Those skilled in the art will appreciate the division of functionality between these modules may be allocated in a different manner than described herein and remain within the scope of the invention. Those skilled in the art to which this application relates will also appreciate that other and further additions, deletions, substitutions and modifications may be made to the described embodiments without departing from the scope of the description and the claims.

The processor 310 may be any type of electronic controller, e.g. a general microprocessor or microcontroller, an ASIC device configured to implement controller functions, a state machine, etc. Similarly the memory 320 may be any type or memory, e.g. static random access memory (SRAM), dynamic random access memory (DRAM), programmable read-only memory (PROM), flash memory and the like. The memory 320 includes data structures 350, described below, configured to implement time-to-recover functions. The data structures 350 may also include historical data describing the response of the conditioned space to control output of the processor 310. The interface 330 may be any configuration of electronic devices configured to communicate with the comfort sensor 130. Similarly, the demand unit interface may be any configuration of electronic devices configured to communicate with a blower, fan, compressor, furnace, or other HVAC component to provide a HVAC service such as cooling or heating.

The processor 310 uses data provided by the comfort sensor 130 to sense the response of the IAT to the control actions. The processor 310 executes instructions 360 stored by the memory 320 to implement a setback calculation module 370. The setback calculation module 370 provides functions related to the manipulation of the data structures 350, and calculation of a setback temperature dependent on a predetermined recovery time. These aspects are described more fully below.

FIG. 4 illustrates a generalized nonlimiting example of smooth setback recovery of the IAT of the space conditioned by the system 100 to illustrate various terms. The IAT starts at a current comfort characteristic setpoint, e.g. a temperature $Temp_{csp}$ and ends at a new comfort characteristic setpoint, e.g. a temperature $Temp_{nsp}$. A setback temperature value $\Delta Temp_{Setback}$ is the difference $Temp_{nsp}-Temp_{csp}$. The IAT begins warming at a time $t_1$, and completes warming at a time $t_2$. A recovery time $\Delta Time_{Recover}$ is equal to $(t_2-t_1)$. The system 100 has a heating recovery rate $H_{RR}$ represented by the slope of the temperature between time $t_1$ and time $t_2$. The recovery time may be expressed as $$\Delta Time_{Recover} = \frac{Temp_{nsp} - Temp_{csp}}{H_{RR}} \tag{3}$$

As a nonlimiting example for some heat pump systems $H_{RR}$ is fixed at about 6° F./hr (~3.3° C./hr), while for some fossil fuel or electric strip heating systems $H_{RR}$ is fixed at about 12° F./hr (~6.6° C./hr).

While a particular HVAC system may be designed to have a particular $H_{RR}$, other variables may impact the actual recovery rate. For example, outside air temperature (OAT), efficiency of equipment, and thermal loss or gain of the conditioned structure are but some of the variables that may influence the actual recovery rate. Because of the uncertainty produced by these variable, the SSR may either achieve the new setpoint too soon (resulting in a waste of energy) or too late (resulting in an uncomfortable temperature).

As further described below, the inventor has recognized that the conventional view of recovery time represented by Eqs. 1 or 3 may instead be expressed broadly as $$\Delta Temp_{Setback} = f(\Delta Time_{Recover}) \tag{4}$$

Furthermore, $\Delta Time_{Recover}$ can be stated as a function of a variety of environmental inputs and control inputs. Hence $$\Delta Time_{Recover} = f(\text{environmental inputs}, \text{control inputs}) \tag{5}$$

Environmental inputs may include, but not be limited to, local environmental conditions, e.g. current indoor air temperature (IAT), outdoor air temperature (OAT), solar gain, outdoor wind speed, and HVAC system heating or cooling capability. Herein external environmental conditions are those environmental conditions external to the conditioned structure, e.g. outdoor air temperature (OAT), solar gain, and outdoor wind speed. Control inputs may include, but not be limited to $Temp_{nsp}$ and $Temp_{csp}$.

The relationship of $\Delta Temp_{Setback}$ to $\Delta Time_{Recover}$ expressed by Eq. 5 may form the basis for novel methods of controlling the operation of the system 100. In various described embodiments $\Delta Temp_{Setback}$ is set to a temperature that is dependent on a specified $\Delta Time_{Recover}$. In other words, while conventional HVAC control treats the $\Delta Temp_{Setback}$ as an independent variable and $\Delta Time_{Recover}$ as a dependent variable, embodiments of the invention treat $\Delta Time_{Recover}$ as the independent variable and $\Delta Temp_{Setback}$ as the dependent variable. In an illustrative and nonlimiting embodiment, Eq. 6 expresses $\Delta Time_{Recover}$ as a function of the setback temperature and $H_{RR}$:

$$\Delta Temp_{Setback} = Temp_{nsp} - Temp_{csp} = \Delta Time_{Recover} \cdot H_{RR} \qquad (6)$$

Aspects of the discussion below address the embodiment represented by Eq. 6. This embodiment and such discussion serve as illustrative and nonlimiting examples to describe various principles that pertain to embodiments of the disclosure. Therefore, these examples are not to be read to limit the scope of the invention as defined by the claims.

FIGS. 5A and 5B illustrate aspects of implementing time-based setback recovery in the system 100. FIG. 5A illustrates a nonlimiting embodiment of a three-dimensional dataset 500. The dataset 500 may be stored, e.g. by the memory 320. The dataset 500 includes a plurality of tables 510-1, 510-2 . . . 510-n. Each table is populated with recovery time data appropriate to a unique combination of independent environmental variables, e.g. conditions, that may affect the recovery time of the IAT of the conditioned space. The environmental conditions, or variables, may include any one or more of the aforementioned local environmental conditions. The dataset 500 is configured for heating in a nonlimiting example. In this example each table of the dataset 500 corresponds to a unique OAT as the environmental input. Similar datasets 500 could be constructed with other individual environmental inputs or combinations of environmental inputs. Such inputs include, but are not limited to current indoor air temperature (IAT), outdoor air temperature (OAT), solar gain, outdoor wind speed, and HVAC system heating or cooling capability. Those skilled in the pertinent art will appreciate the principles described are also applicable to embodiments in which the system 100 is cooling, humidifying, dehumidifying or filtering the conditioned space.

The table 510-1 corresponds to a minimum temperature for which the dataset 500 is configured. In the current example, the minimum OAT is 48° F. (~9° C.). The table 510-2 corresponds to the minimum temperature plus a temperature increment, e.g. 1° F. (~0.5° C.). Thus the table 510-2 corresponds to an OAT of 49° F. (~9.5° C.). However, the increment can be any desired value.

The $\Delta Time_{Recover}$ of the system 100 will typically depend in part on the OAT. For example, the system 100 may be able to raise the inside air temperature (IAT) at a rate of 12° F./hr (~11° C./hr) when the OAT is 48° F. (~9° C.), but only 10° F./hr (~5° C./hr) when the OAT is 32° F. (0° C.) due to thermal loss by the conditioned structure. In some embodiments the dataset 500 includes a table for each OAT that results in a different $\Delta Time_{Recover}$ for the residence within a predetermined precision. In an illustrative and nonlimiting example, in a geographical region for which the OAT is expected to range from 0° F. (—18° C.) to 68° F. (20° C.) during the heating season, the dataset 500 may include 68 tables, e.g. one table for each increment of 1° F. (~0.5° C.). In another illustrative and nonlimiting example, in a more temperate climate the dataset 500 may include 11 tables, e.g. one table for each increment of 5° F. (~2.8° C.) from 20° F. (~6.7° C.) to 70° F. (~21° C.). Of course more or fewer tables may be used depending on the desired resolution of the $\Delta Time_{Recover}$. Moreover, if the dataset 500 is configured for degrees centigrade, each table may correspond to an OAT increment appropriate to the desired temperature precision in centigrade.

Initially addressing the table 510-1 of the illustrated embodiment, the matrix of temperature values corresponds to an outside air temperature of 48° F. (~9° C.). The matrix includes a header row of setpoint (SP) temperatures 55, 56, 57, . . . M and a leader column of IAT values 55, 56, 57, . . . N. Locations of the matrix are referred to herein by (SP, IAT) pair. Thus, e.g. a first entry location is referenced as (55, 55). The entry at (55, 55) includes a "don't care" or "x" value, reflecting the absence of any needed recovery when the TAT is equal to or greater than the setpoint temperature. Similarly, all entries are "x" along a diagonal of matrix locations for which the IAT equals the setpoint temperature, as well as matrix locations for with the TAT and/or the setpoint temperature is less than the temperature along the diagonal.

The entry at (56, 55) is "5", e.g. the system 100 requires 5 minutes to raise the temperature of the particular residence from 55° F. (~12.8° C.) to 56° F. (~13.3° C.) when the OAT is 48° F. (~9° C.). Similarly the entry at (57, 55) is "6", indicating the system 100 needs 6 minutes to raise the temperature from 55° F. (~12.8° C.) to 57° F. (~13.9° C.). At the top setpoint temperature, 72° F. (~22.2° C.) in this example, the system 100 requires 120 minutes to raise the IAT from 55° F. to 72° F.

FIG. 5B illustrates the table 510-2, which in the illustrated example corresponds to an outside temperature of 49° F. (~9.4° C.). In this case, the system 100 may need 4.8 minutes to raise the IAT from 55° F. (~12.8° C.) to 56° F. (~13.3° C.), 5.8 minutes to raise the IAT from 55° F. (~12.8° C.) to 57° F. (~13.9° C.), 4.2 minutes to raise the IAT from 56° F. (~13.3° C.) to 57° F. (~13.9° C.), and 135 minutes to raise the IAT from 55° F. (~12.8° C.) to 72° F. (~22.2° C.). Those skilled in the pertinent art are able to extend the illustrated principle to completely populate the illustrated tables and to populate additional tables for other OATs.

Returning to FIG. 5A, an operator may enter via a keypad on the controller 120, or any other suitable interface, an "occupied" time period, an "unoccupied" time period and a maximum recovery time $\Delta Time_{Recover}$ associated with the transition from the "unoccupied" period to the "occupied" period. For example, the operator may select a 10 minute recovery to be completed when the operator arrives at home. The table location corresponding to a setpoint of 65° F. (~18.3° C.) and an IAT of 62° F. (~16.7° C.) contains the value "10". The processor 310 may scan the table column associated with the 65° F. (~18.3° C.) setpoint to locate the table entry "10". The processor 310 may then determine the leader value, e.g. the setback temperature, row associated with the located entry, 62° F. (~16.7° C.) in this example. The processor 310 then uses the value of 62° F. (~16.7° C.) as the setpoint temperature of the system 100 during the setback (unoccupied) period.

In cases for which the table lacks an exact match of the recovery time entered by the operator, the processor 310 may interpolate between existing values to find the closest match of setback temperature.

After the system 100 satisfies the requested demand (e.g. raises the temperature to the setpoint temperature programmed for "occupied" period) the processor 310 may update the table entry if needed. The processor 310 may update the table entry through such methods, including but not limited to, a simple replacement of the existing value with the last measured recovery time, a simple moving average of the last N number of samples, a weighted average of the last N number of samples, or a proportional, integral, differential (PID) algorithm. In the example of a simple replacement of the existing value with the last measured time, if only 9 minutes were needed to raise the temperature from 62° F. (~16.7° C.) to 65° F. (~18.3° C.), then the controller may replace the value at (65, 62) with "9".

Thus, when the controller 120 is programmed in this manner, the controller 120 may control the system 100 to maintain the IAT at 62° F. (~16.7° C.) during the setback period, e.g. when the home is unoccupied, and begin warming the IAT to 65° F. (~18.3° C.) 10 minutes prior to the end of the setback period. Similarly, if the operator programs the controller 120 to recover in no more than 50 minutes, then the controller 120 may control the system 100 to maintain an IAT of 55° F. (~12.8° C.) during the setback period, and begin warming the IAT to 65° F. (~18.3° C.) 50 minutes prior to the end of the setback period as shown in cell (65,55).

The dataset 500 may also be used to improve smooth setback recovery of the system 100 when operating in a traditional setback recovery mode, e.g. when the recovery time is treated as a dependent variable. This mode of operation is referred to as the SSR mode for brevity below. For example, referring to FIG. 4, the processor 310 may be configured to begin raising the IAT at time $t_1$ from $Temp_{csp}$ to $Temp_{nsp}$. The processor 310 may have stored a parameter based on historical performance that indicates that a particular time $\Delta t = t_2 - t_1$ is needed to raise the temperature from $Temp_{csp}$ to $Temp_{nsp}$. However, in contrast to conventional SSR operation, the processor 310 may refer to the dataset 500 to determine if $\Delta t$ is sufficient to raise the IAT from $Temp_{csp}$ to $Temp_{nsp}$. If, for instance, processor 310 may have previously determined that 20 minutes is sufficient to raise the temperature from $Temp_{csp}$ to $Temp_{nsp}$ in SSR mode. However, dataset 500 may indicate that based on the current IAT and setpoint temperature, only 15 minutes are necessary to raise the temperature as requested. Under this circumstance the processor 310 may begin heating the conditioned space five minutes later than the SSR mode would otherwise indicate. Thus, the system 100 expends less energy maintaining the IAT at the setpoint temperature than would otherwise be the case, thereby improving system efficiency.

The table entries may be provided, e.g. as factory defaults, by initial system setup, values entered by the occupant based on empirical data, or by the processor 310 based on empirical/historical data. Historical data may be gathered by the processor 310 by determining an actual recovery rate at a particular value of an independent variable, e.g. OAT, and comparing the actual recovery rate to the expected recovery rate. Where the rates differ by a significant amount, the processor 310 may replace a previously stored value in the dataset 500 with an updated value using any of the methods previously described with respect to table entry update. The processor 310 may update some or all of the dataset 500 locations as operation under a variety of conditions provided a breadth of empirical/historical data.

Turning to FIG. 6, a method 600 of manufacturing a system, e.g. an HVAC system, is presented. The method 600 is described without limitation with reference to the previously described features, e.g. in FIGS. 1-5. The steps of the method 600 are presented in a nonlimiting order, may be performed in another order or in some cases omitted.

In a step 610 a system controller, e.g. the controller 120, is configured to control the operation of a demand unit, e.g. the demand unit 110, to maintain a comfort characteristic setpoint of a conditioned space. In a step 620 a setback calculation module of the system controller, e.g. the setback calculation module 370, is configured to calculate a setback value of the setpoint as a function of a recovery time from the setback value to the setpoint.

In some embodiments of the method 600 the comfort characteristic setpoint may be a setpoint temperature and the setback value may be a setback temperature.

In any of the above embodiments of the method 600 the system controller may calculate the setback value from a historical rate of recovery.

In any of the above embodiments of the method 600 the system controller and the demand unit may be components of a residential system.

In some of the above embodiments of the method 600 the system controller and the demand unit may be components of a commercial rooftop system.

In some of the above embodiments of the method 600 the system controller and the demand unit may be components of a refrigeration system.

In some of the above embodiments of the method 600 the comfort characteristic may be one of a relative humidity and a particulate concentration.

In any of the above embodiments of the method 600 the system controller may be configured to receive a user input value of the recovery time.

Those skilled in the art to which this application relates will appreciate that other and further additions, deletions, substitutions and modifications may be made to the described embodiments.

What is claimed is:

1. A heating, ventilation and air-conditioning system, comprising:
    a system controller configured to control the operation of a demand unit to maintain a comfort characteristic setpoint of a conditioned space; and
    a setback determination module of said system controller configured to determine a setback value of said setpoint based on a recovery time from said setback value to said setpoint, wherein:
    said recovery time is selected by an operator of said heating, ventilation and air conditioning system; and
    said setback value is determined, based on said selected recovery time and one or more measured local environmental conditions, using a plurality of tables, wherein each table of the plurality of tables corresponds to a particular outdoor air temperature, and includes a plurality of recovery time values corresponding to combinations of a comfort characteristic setpoint value and an internal air temperature at the particular outdoor air temperature.

2. The system as recited in claim 1, wherein said comfort characteristic setpoint is a setpoint temperature and said setback value is a setback temperature.

3. The system as recited in claim 1, wherein at least a portion of the recovery time values in said tables are determined using historical rate of recovery information.

4. The system as recited in claim 1, wherein said system controller and demand unit are components of a residential system.

5. The system as recited in claim 1, wherein said system controller and demand unit are components of a commercial rooftop system.

6. The system as recited in claim 1, wherein said setback value is determined using interpolation of recovery time values from two or more tables of the plurality of tables.

7. The system as recited in claim 1, wherein each table is further associated with an outdoor wind speed.

8. The system as recited in claim 1, wherein said comfort characteristic is one of relative humidity and particulate concentration.

9. The system as recited in claim 1, wherein each table is further associated with an amount of solar gain.

10. A method of operating a heating, ventilation and air-conditioning system, comprising:
configuring a system controller to control the operation of a demand unit to maintain a comfort characteristic setpoint of a conditioned space; and
configuring a setback determination module of said system controller to determine a setback value of said setpoint based on a recovery time from said setback value to said setpoint;
wherein:
said recovery time is selectable by an operator of said heating, ventilation and air-conditioning system; and
said setback value is determined, based on said selected recovery time and one or more measured local environmental conditions, using a plurality of tables, wherein each table of the plurality of tables corresponds to a particular outdoor air temperature, and includes a plurality of recovery time values corresponding to combinations of a comfort characteristic setpoint value and an internal air temperature at the particular outdoor air temperature.

11. The method as recited in claim 10, wherein said comfort characteristic setpoint is a setpoint temperature and said setback value is a setback temperature.

12. The method as recited in claim 10, wherein at least a portion of the recovery time values in said tables are determined using historical rate of recovery information.

13. The method as recited in claim 10, wherein said system controller and demand unit are components of a residential system.

14. The method as recited in claim 10, wherein said system controller and demand unit are components of a commercial rooftop system.

15. The method as recited in claim 10, wherein said system controller and demand unit are components of a refrigeration system.

16. The method as recited in claim 10, wherein said setback value is determined using interpolation of recovery time values from two or more tables of the plurality of tables.

17. The method as recited in claim 10, wherein each table is further associated with an outdoor wind speed.

18. The method as recited in claim 10, wherein said comfort characteristic is one of relative humidity and particulate concentration.

19. The method as recited in claim 10, wherein each table is further associated with an amount of solar gain.

20. A heating, ventilation and air-conditioning system controller, comprising:
a processor; and
a memory containing instructions,
wherein:
said instructions are configured to control the operation of a demand unit to maintain a comfort characteristic setpoint of a conditioned space, and to determine a setback value of said setpoint based on a recovery time from said setback value to said setpoint;
said recovery time is selectable by an operator of a heating, ventilation and air-conditioning system associated with said heating, ventilation and air-conditioning system controller; and
said setback value is determined, based on said selected recovery time and one or more measured local environmental conditions, using a plurality of tables, wherein each table of the plurality of tables corresponds to a particular outdoor air temperature, and includes a plurality of recovery time values corresponding to combinations of a comfort characteristic setpoint value and an internal air temperature at the particular outdoor air temperature.

21. The controller as recited in claim 20, wherein said comfort characteristic setpoint is a setpoint temperature and said setback value is a setback temperature.

22. The controller as recited in claim 20, wherein at least a portion of the recovery time values in said tables are determined using historical rate of recovery information.

23. The system as recited in claim 20, wherein each table is further associated with an outdoor wind speed or an amount of solar gain.

24. A heating, ventilation and air-conditioning system controller, comprising:
a processor; and
a memory containing a plurality of tables, wherein each table of the plurality of tables corresponds to a particular outdoor air temperature, and includes a plurality of recovery time values corresponding to combinations of a comfort characteristic setpoint value and an internal air temperature at the particular outdoor air temperature,
wherein:
said processor is configured to maintain a comfort characteristic setpoint of a conditioned space using a setback value of said setpoint determined based on a recovery time;
said recovery time is selectable by a user of a heating, ventilation and air-conditioning system associated with said heating, ventilation and air-conditioning system controller; and
said setback value is determined, using the plurality of tables, based on said recovery time and one or more measured local environmental conditions.

25. The controller as recited in claim 24, wherein said processor is further configured to update said tables using a last measured recovery time for a combination of a particular outdoor air temperature, a particular comfort characteristic setpoint, and a particular internal air temperature.

26. The controller as recited in claim 24, wherein said setback value is determined using interpolation of recovery time values from two or more tables of the plurality of tables.

27. The system as recited in claim 1, wherein:
each table comprises rows corresponding to particular internal air temperatures and columns corresponding to particular comfort characteristic setpoint values; and
the recovery time values corresponding to combinations of comfort characteristic setpoint values and internal air temperatures are located at intersections of the rows and the columns.

28. The system as recited in claim 1, wherein said one or more measured local environmental conditions includes a current internal air temperature and a current outdoor air temperature, and determining said setback value based on said selected recovery time comprises:
accessing a table of the plurality of tables based on the current outdoor air temperature;
scanning the table to locate a recovery time value corresponding to said current internal air temperature and being at least approximately equal to said selected recovery time; and
determining a comfort characteristic setpoint value in the table corresponding to said located recovery time value.

* * * * *